UNITED STATES PATENT OFFICE.

JOHN W. BARTLETT, OF MOLINE, ILLINOIS, ASSIGNOR TO HIMSELF AND M. WITHERELL, OF SAME PLACE.

IMPROVEMENT IN SOAP COMPOSITIONS.

Specification forming part of Letters Patent No. 187,245, dated February 13, 1877; application filed November 4, 1876.

*To all whom it may concern:*

Be it known that I, JOHN W. BARTLETT, of Moline, in the county of Rock Island and State of Illinois, have invented a new and useful Improvement in Machine-Soap, of which the following is a specification:

The object of this invention is to furnish an improved soap for cleaning machinery, brass and silver mountings upon machinery, for application to car and wagon axles, and all kinds of heavy friction-surfaces, for removing iron-grease, paint, and varnish from the hands, and for other similar uses.

The invention consists in a machine-soap formed of rain-water, pulverized lime, soap-stone, carbonate of potash, chloride of lime, concentrated lye, golden machine-oil, cotton-seed oil, lard-oil, and melted lard, compounded in the proportions and manner hereinafter fully described.

In preparing this soap, I take five gallons of rain-water, two pounds of pulverized lime, one pound of soap-stone, twelve ounces of carbonate of potash, eight ounces of chloride of lime, and one pound of concentrated lye, mix them together, stir them thoroughly, boil one hour, and then add fifty gallons of soft water, and again thoroughly stir the mixture. I then mix together half a gallon of golden machine-oil, half a gallon of cotton-seed oil, one pint of lard-oil, and one pound of melted lard. Into this mixture I slowly pour six quarts of the mixture first prepared, and stir it rapidly until thoroughly mixed, and the soap is ready for use.

The golden machine-oil, above alluded to, consists of two parts of paraffine and one part of spring oil.

This spring-oil is known in many parts of the West as rock-oil. It is as thick as molasses, as clear as honey, and has a bluish tinge; being obtainable from springs by spreading a woolen cloth on top of the water.

Having thus described my invention, I claim as new and desire to secure by Letters Patent—

A machine-soap, formed of rain-water, pulverized lime, soap-stone, carbonate of potash, chloride of lime, concentrated lye, golden machine-oil, cotton-seed oil, lard-oil, and melted lard, compounded in the proportions substantially as herein set forth and described.

JOHN W. BARTLETT.

Witnesses:
MARCUS GOLDBERG,
HANS LAFRENZ.